United States Patent

[11] 3,578,285

[72] Inventor Sydney E. Carlton
240 W. Hereford St., Gladstone, Oreg. 97027
[21] Appl. No. 836,926
[22] Filed June 26, 1969
[45] Patented May 11, 1971

[54] SAMPLE AND BLEED VALVE
4 Claims, 5 Drawing Figs.
[52] U.S. Cl. ................................................. 251/218, 251/144, 251/325, 251/351
[51] Int. Cl. ........................................................ F16k 31/50
[50] Field of Search............................................ 251/44, 214, 215, 218, 274, 286, 287, 325, 347, 351, 353, 346; 222/519, 548, 549, 553; 137/321, 322, 323

[56] References Cited
UNITED STATES PATENTS

| | | | |
|---|---|---|---|
| 1,397,220 | 11/1921 | Lord................................ | 251/287X |
| 1,606,912 | 11/1926 | Young............................. | 251/144X |
| 2,045,758 | 6/1936 | Crossen, Jr..................... | 251/144X |
| 2,841,314 | 7/1958 | Munson et al. ................ | 222/519 |
| 3,164,308 | 1/1965 | Marcovitch et al. .......... | 222/549 |

Primary Examiner—M. Cary Nelson
Assistant Examiner—David R. Matthews
Attorney—Henry Gifford Hardy ABSTRACT: The bleed valve of the present invention has a fixed body member for installation through the wall of the particular pressure vessel involved so as to be in direct communication with the cavity. The main valve portion moves axially from the closed to the open position for bleeding or sampling and is restrained from going beyond the full open position. The slidable portion is sealed against leakage of fluid pressure by an O-ring which has its own housing in the slidable portion and so remains in position at all times. It is always positioned beyond the fully open position so that no pressure or sample escapes beyond the intended outlet. The valve is useful for bleeding air or fluid under pressure in a pressure vessel, pump, or valve, particularly as a means for checking seals, sampling the contents, or reducing internal pressures.

Patented May 11, 1971
3,578,285
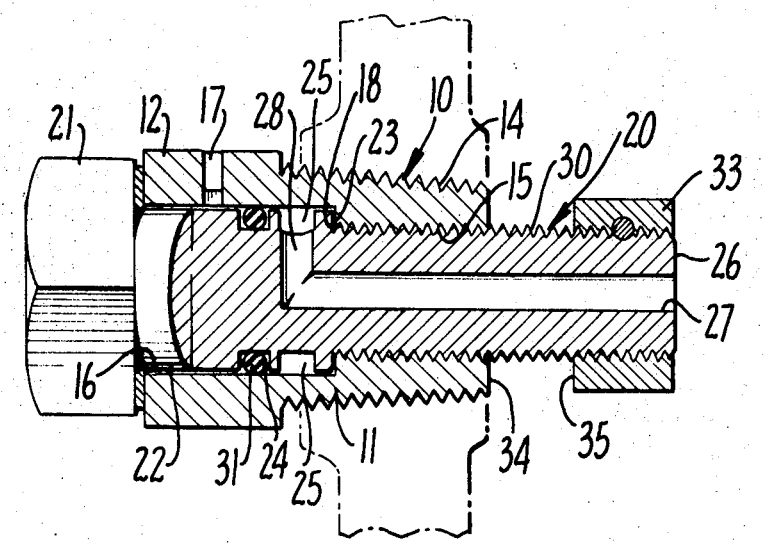
FIG. 1.
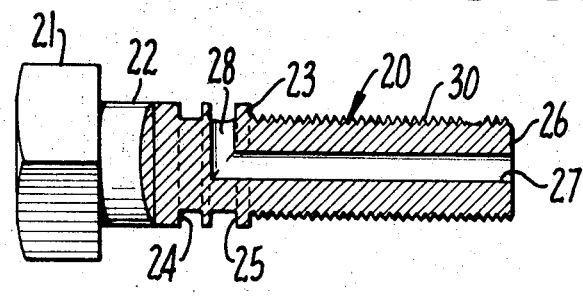
FIG. 2.
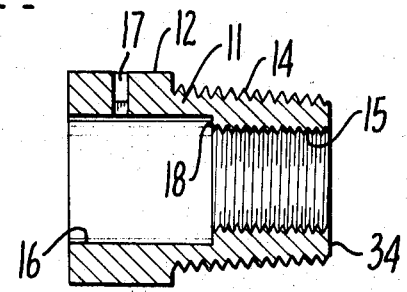
FIG. 3.
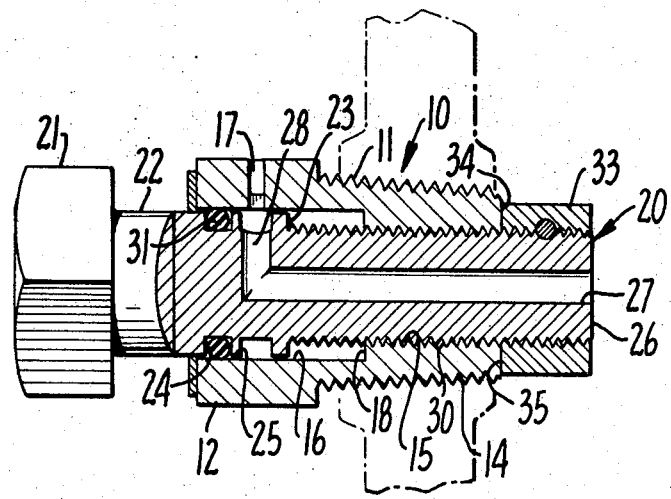
FIG. 5.
FIG. 4.
INVENTOR.
SIDNEY E. CARLTON
BY Henry Gifford Hardy
ATTORNEY

SAMPLE AND BLEED VALVE

Most sampling of contents within the pressure vessel is done simply by means of removing a plug which had been driven into an aperture leading to the interior of the vessel. The plug must therefore be knocked out of or pulled from the closed position in order to make the sampling or relieve the pressure, and frequently the plug is blown out, damaged or lost. When there is damage to the plug, the seal will not be satisfactory when the plug is repositioned. The valve of the present invention is designed to eliminate this crudeness in bleeding and sampling of pressure vessels and permits the sampling or bleeding to take place in a predictable manner at a convenient position and direction. This valve eliminates all hazards in sampling or bleeding of a pressure vessel. It further provides a controlled on and off position and provides an outlet which is directed safely and surely, as desired. The position of the O-ring seal between the body and the axially moveable member is an important feature in that it provides a groove for the O-ring which is positioned axially external of the outlet opening in the open position, so that at no time will there be any leaks, unless specifically intended by the open position.

Further objects are to provide a construction of maximum simplicity, economy, and ease of manufacture, also such further objects, advantages and capabilities as will fully appear and as are inherently possessed by the device and the invention described herein.

Invention further resides in the combination, construction and arrangement of parts illustrated in the accompanying drawings, and while there is shown therein a preferred embodiment thereof, it is to be understood that the same is merely illustrative of the invention and that the invention is capable of modification and change, and comprehends other details of construction without departing from the spirit thereof or the scope of the appended claims. In the drawings:

FIG. 1 of the drawings is a longitudinal section showing the bleed and sample valve of the present invention in the closed position;

FIG. 2 is a longitudinal section of the axially moveable member;

FIG. 3 is a longitudinal section of the main body member;

FIG. 4 is a plan view of the head of the body member; and

FIG. 5 is a view similar to FIG. 1 but with the valve in the open position.

Referring now to the drawings in which like numerals refer to like parts in the several views, the body member 11 of the valve generally designated 10, has a hexagonally shaped head portion 12 so shaped for convenience in handling with a wrench, although obviously it may be of any suitable configuration desired. The lower portion 14 may be threaded on a tapered reducing diameter for insertion into and through the wall of the particular pressure vessel involved. It is apparent that threading is unnecessary and can be in the form of a plug which is driven into position and secured by welding or any other suitable means. This body member has an axial bore 15 therethrough and is internally threaded, the purpose of which will be apparent as this description proceeds. It is counterbored on a larger diameter at 16 for a considerable distance of its total length. The larger diameter leaves a shoulder 18 at the internal beginning of the threaded portion 15. At right angles to the counterbore 16 is an outlet opening 17, passing completely through the wall of the solid portion 12.

The axially moveable member best shown in FIG. 2 and generally designated 20, is an elongated valve for axial movement within the body 11. It has a hexagonal head 21 and an axially extending cylindrical portion 22 terminating in a shoulder 23. The head portion is so shaped to accommodate a wrench for turning, but here again, any suitable configuration may be used. The cylindrical portion 22 is cut with an annular groove 24 which is the O-ring groove and a peripheral annular channel 25. From its inner end 26, there is an axial bore 27 which extends inwards axially to a point corresponding with the annular channel 25. Between the channel 25 and the bore 27, is a communicating passage 28. From the shoulder 23 to the end 26 the external diameter is threaded as at 30, to engage the threads 15 of the body member and move axially with respect thereto. An O-ring 31 is placed within the annular groove 24 and remains at all times in sliding and sealing contact with the inner face 16 of the body member 11.

It should be pointed out that the relationship and engagement of internal threads 15 of the body member and external threads 30 of the axially moveable member may be a sliding fit or a keyed fit, and do not necessarily have to be threaded to provide the axial movement. Also a large spiral acme thread for fast axial movement may be used with success. The axially moveable portion 20 is provided with a collar 33 threaded to the inner end 26 thereof, as will be more fully described.

In use, the body portion 11 is suitably secured through the wall of a pressure vessel such as by the threads 14, by welding, or in any other suitable manner. It thus remains in fixed position through the wall of the pressure vessel. The axially moveable member 20, with the O-ring 31 in position as described above, is then positioned for axial movement within the body member 11. The threaded portion 30 obviously extends into the interior of the pressure vessel so that when this is in position, there is communication from the interior through the bore 27, the connecting passage 28 and to the axial groove 25. In the closed position, shown in FIG. 1, the pressure or fluid contents of the vessel can not escape and is sealed by the O-ring 31 in its channel 24. When the member 20 is in the closed position in the vessel, the collar 33 is secured to the end 26 in the interior of the vessel leaving enough space between the inner end face 24 of the body member 11 and the outer face 35 of the collar 33 to provide axial movement to the open position shown in FIG. 5. Here it will be observed that the collar 33 provides a stop against further axially outward movement when the outlet passage 28 registers with the passage 17 of the body member. This occurs when the face 34 of the body member abuts the face 35 of collar 33. Upon determination of the fully open position, the collar 33 is secured in position by any suitable means. In the closed position, the shoulder 14 of the body member 11 abuts the shoulder 18 of the axially moveable member 20.

Assuming the closed position shown in FIG. 1 with the valve located in the wall of a pressure vessel, the valve is operated by turning the head 21, or withdrawing it if it is a slide fit, to cause the axially moveable portion 20 to move axially outward away from the exterior wall of the vessel. Normally, where the threaded engagement is used, the head 21 is rotated by means of a common wrench. However, if a sliding fit is used, it may be operated by a lever air cylinder or other mechanical means of pulling the member outwardly to the open position, and vice versa. The O-ring 31 in its own housing 24, is maintained in a sliding and sealing engagement with the inner face 16 of the fixed body member 11. In moving the valve to the open position, the O-ring 31 passes over the outlet passage 17 so that when the communicating channel 25 in any way registers with the outlet passage 17, the O-ring is axially outward in position with respect to the outlet opening 17. It will be observed that the sampling or bleeding from the interior of the vessel can be in any degree from just barely open to the fully open position shown in FIG. 5. Thus, the amount of bleed of sample can be regulated in accordance with the desires of the particular operation. The outward axial movement is stopped by the abutment of the collar face 35 against the inner body face 34 which ensures that the axially moveable member can not be turned beyond the fully open position. The valve is closed by reversing the turn moment. In the fully closed position, shown in FIG. 1, the O-ring 31 is axially well within the body member 11 and this point is determined by abutment of the shoulder 23 against the shoulder 18 of the body member 11.

It is, of course, desirable to place the valve through the wall of the pressure vessel at a point to which there is easy and convenient access. It is equally desirable to place the outlet 17 of the assembly in a direction which will be best suited for the purposes involved. In any event, the operator knows at all times the amount and the direction of the flow for the bleed or sample because of the position of the outlet 17.

I claim:

1. A bleed valve having an elongated member movable axially within a fixed body member, a fixed body member adapted to be secured through the wall of a vessel having an outlet port externally of the vessel, said elongated member having an axial passage partly therethrough opening into the interior of a vessel at its inner end and connecting with an exit passage therein at its outer end, said exit passage being angularly disposed with respect to said axial passage and adapted to register with the outlet port of said fixed body member in the open position, and a fluidtight seal outwardly of said exit passage continuously sealing against the inner surface of said fixed body member.

2. The bleed valve of claim 1 wherein the elongated member is formed to employ a tool for axial movement from the closed to the open position and vice versa.

3. The bleed valve of claim 1 wherein the elongated member has a stop on its inner end to prevent axial withdrawal through the fixed member.

4. The bleed valve of claim 1 wherein the fixed member threadably receives the elongated member for rotary axial movement.